United States Patent
Miller et al.

(10) Patent No.: US 7,267,478 B2
(45) Date of Patent: Sep. 11, 2007

(54) BLENDER CONTAINER WITH OFF CENTER BLADE ASSEMBLY

(75) Inventors: Brent A. Miller, Duncansville, PA (US); Richard D. Boozer, Wakeman, OH (US); Michael D. Anton, Olmsted Township, OH (US)

(73) Assignee: Vita-Mix Corporation, Cleveland, OH (US)

( * ) Notice: Subject to any disclaimer, the term of this patent is extended or adjusted under 35 U.S.C. 154(b) by 0 days.

(21) Appl. No.: 11/410,687

(22) Filed: Apr. 24, 2006

(65) Prior Publication Data

US 2006/0187749 A1    Aug. 24, 2006

Related U.S. Application Data

(62) Division of application No. 10/481,969, filed as application No. PCT/US02/17827 on Jun. 5, 2002, now Pat. No. 7,063,456.

(60) Provisional application No. 60/301,081, filed on Jun. 26, 2001.

(51) Int. Cl.
*A47J 43/046* (2006.01)
(52) U.S. Cl. ..................... 366/205; 366/314
(58) Field of Classification Search ............. 366/205, 366/206, 314, 306–307; 241/282.1, 282.2; 99/348
See application file for complete search history.

(56) References Cited

U.S. PATENT DOCUMENTS

| | | | |
|---|---|---|---|
| 2,086,858 A | * | 7/1937 | Dunkelberger .............. 366/314 |
| 2,282,866 A | * | 5/1942 | Hagen ........................ 366/205 |
| D163,117 S | | 5/1951 | Hobbs |
| 2,798,701 A | | 7/1957 | Collura |
| 2,924,349 A | | 2/1960 | Huck |
| D198,303 S | | 5/1964 | Dewenter |
| 3,175,594 A | | 3/1965 | Jepson et al. |
| 3,216,473 A | * | 11/1965 | Dewenter ................... 241/167 |
| 3,240,246 A | * | 3/1966 | Dewenter .................... 241/98 |
| 3,318,583 A | | 5/1967 | Wright et al. |
| 3,342,425 A | | 9/1967 | Morton et al. |
| D227,535 S | | 7/1973 | Grimes |
| 3,837,587 A | | 9/1974 | Walter et al. |
| 3,873,435 A | | 3/1975 | Ziebarth et al. |

(Continued)

FOREIGN PATENT DOCUMENTS

JP          1-145031          6/1989

(Continued)

*Primary Examiner*—Charles E. Cooley
(74) *Attorney, Agent, or Firm*—Renner, Kenner, Greive, Bobak, Taylor & Weber

(57) ABSTRACT

A container (15) for a blender (10) includes a bottom surface (16) having a non-symmetrically shaped perimeter. A side wall (17) extends upwardly from the perimeter of the bottom surface (16). A mixing blade assembly (20) having a plurality of blades (21) is located above the bottom surface (16) and is rotatable on an axis which is displaced from the center of the bottom surface (10). Nonuniform spaces (25, 26) are thus created between the ends of the blades (21) and the side wall (17). The bottom surface (16) is inclined at an angle relative to the plane normal to the axis of rotation of the blade assembly (20), and it, as well as the side wall (17), may be provided with a plurality of spaced vanes (31, 32).

2 Claims, 3 Drawing Sheets

U.S. PATENT DOCUMENTS

| | | | |
|---|---|---|---|
| 4,087,053 A * | 5/1978 | Voglesonger | 241/282.1 |
| 4,136,022 A | 1/1979 | Hutzler et al. | |
| 4,664,530 A | 5/1987 | Kurome et al. | |
| 4,911,557 A * | 3/1990 | Dormer et al. | 366/299 |
| D322,570 S | 12/1991 | Nylander | |
| D336,590 S | 6/1993 | Barnard | |
| 5,219,419 A | 6/1993 | Prothe | |
| 5,323,973 A * | 6/1994 | Ferrara, Jr. | 241/37.5 |
| 5,360,176 A | 11/1994 | Mugge et al. | |
| 5,380,086 A | 1/1995 | Dickson | |
| 5,660,468 A | 8/1997 | Okajima et al. | |
| D435,192 S | 12/2000 | Bohannon, Jr. et al. | |
| D506,393 S | 6/2005 | Nottingham et al. | |
| 6,979,117 B2 * | 12/2005 | Dickson, Jr. | 366/205 |
| 6,981,795 B2 * | 1/2006 | Nikkah | 366/199 |
| 7,063,456 B2 * | 6/2006 | Miller et al. | 366/205 |
| 2006/0187749 A1 * | 8/2006 | Miller et al. | 366/205 |

FOREIGN PATENT DOCUMENTS

| | | | |
|---|---|---|---|
| JP | 1-148220 | * | 6/1989 |
| JP | 1-310616 | | 12/1989 |
| JP | 4-17820 | | 1/1992 |
| WO | 96/15706 A1 | * | 5/1996 |
| WO | 03/001954 A1 | * | 1/2003 |

* cited by examiner

BLENDER CONTAINER WITH OFF CENTER BLADE ASSEMBLY

CROSS-REFERENCE TO RELATED APPLICATION

This application is a divisional application of U.S. patent application Ser. No. 10/481,969 filed Dec. 17, 2003, which claims priority from International Application No. PCT/US 02/17827 filed Jun. 5, 2002 now U.S. Pat. No. 7,063,456 and U.S. Provisional Patent Application No. 60/301,081 filed Jun. 26, 2001.

TECHNICAL FIELD

This invention relates to a container used to blend liquids, foods and the like. More particularly, this invention relates to a blending container which is especially adapted to more efficiently blend highly viscous liquids such as encountered in the preparation of frozen drinks.

BACKGROUND ART

Food processors, oftentimes referred to as blenders, are employed to mix or otherwise blend or process a wide variety of foods. In a typical blender, a container is provided with a blade assembly having a plurality of blades near the bottom thereof which are rotated by a motor situated in a base or pedestal on which the container is placed. The bottom of the container is typically formed flat with a regularly-shaped perimeter, for example, a square or a circle, and the blades are rotatable in the center of that regular configuration. As such, a wide variety of ingredients can be blended in these containers including hot liquids, cold liquids, and solids such as ice, fruits and the like.

The blending of most liquids is accomplished by the action of the rotating blades whereby the fluid is drawn down through the blades, generally near the center thereof. The fluid then returns to the main body of the container by passing upwardly through the gap between the circumferential tip of the blades and the perimeter of the container. Such is an acceptable flow path when dealing with non-viscous fluids; however, when dealing with viscous fluids, such as are prevalent in frozen drinks, for example, smoothies or the like, flow problems are created. Specifically with such fluids, recirculation a significant distance vertically above the blades is not accomplished and a fluid or ice bridge is formed above the blades. As a result, the blades are spinning in a pocket of air and blending is thwarted. When such occurs, the user must usually manually stir the fluid or otherwise break the bridge to force the ingredients down toward the blades. However, with many viscous fluids, the bridge will again form requiring further user intervention. The blending of viscous fluids without manual intervention thus remains a problem in the food processing art.

DISCLOSURE OF THE INVENTION

It is thus an object of the present invention to provide a container for a blender which assures a more complete blending of the ingredients being mixed.

It is a further object of the present invention to provide a container for a blender, as above, which creates an irregular flow pattern to discourage the formation of an air pocket around the blades in the container of the blender.

It is another object of the present invention to provide a container for a blender, as above, which will effectively mix viscous fluids without the need for manual user intervention.

These and other objects of the present invention, as well as the advantages thereof over existing prior art forms, which will become apparent from the description to follow, are accomplished by the improvements hereinafter described and claimed.

In general, a container for a blender made in accordance with one aspect of the present invention includes a bottom surface having a side wall extending upwardly therefrom. A rotatable mixing blade assembly is positioned above the bottom surface, the blade assembly being displaced from the center of the bottom surface.

In accordance with another aspect of the present invention, the container includes a bottom surface having a non-symmetrically shaped perimeter. A side wall extends upwardly from the perimeter of the bottom surface, and a rotatable mixing blade assembly is positioned above the bottom surface.

In accordance with yet another aspect of the present invention, the container includes a bottom surface having a side wall extending upwardly therefrom. A mixing blade assembly is rotatable on an axis and is positioned above the bottom surface. The bottom surface is inclined at an angle relative to the plane normal to the axis of rotation of the blender assembly.

Another aspect of the present invention relates to a container for a blender having a blade assembly rotatable on an axis. The container has a side wall, a side wall surface opposed to the side wall, and a substantially flat wall on each side of the side walls. Each flat wall intersects the surface, and the surface includes at least one wall which is substantially flat. The side wall is closer to the axis than the intersections of the flat walls and the surface.

Additionally, the present invention contemplates a container for a blender having a blade assembly rotatable on an axis. The container includes a bottom surface and a side wall extending upwardly from the bottom surface. The side wall includes a first surface, a second surface having at least one substantially flat portion, and a pair of substantially flat surfaces, one of the flat surfaces being positioned on each side of the first surface. Each flat surface intersects the second surface. The first surface is closer to the axis than the intersections of the flat surfaces and the second surface.

The present invention also contemplates a container for a blender having a blade assembly rotatable on an axis. The container has a curved side wall, a side wall surface having two lobes equidistant from the center of the surface and opposed to the curved side wall, and a substantially flat wall on each side of the curved side wall. Each flat wall intersects the surface. The curved side wall is closer to the axis than the intersection of the flat walls and the surface.

A preferred exemplary container for a blender incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
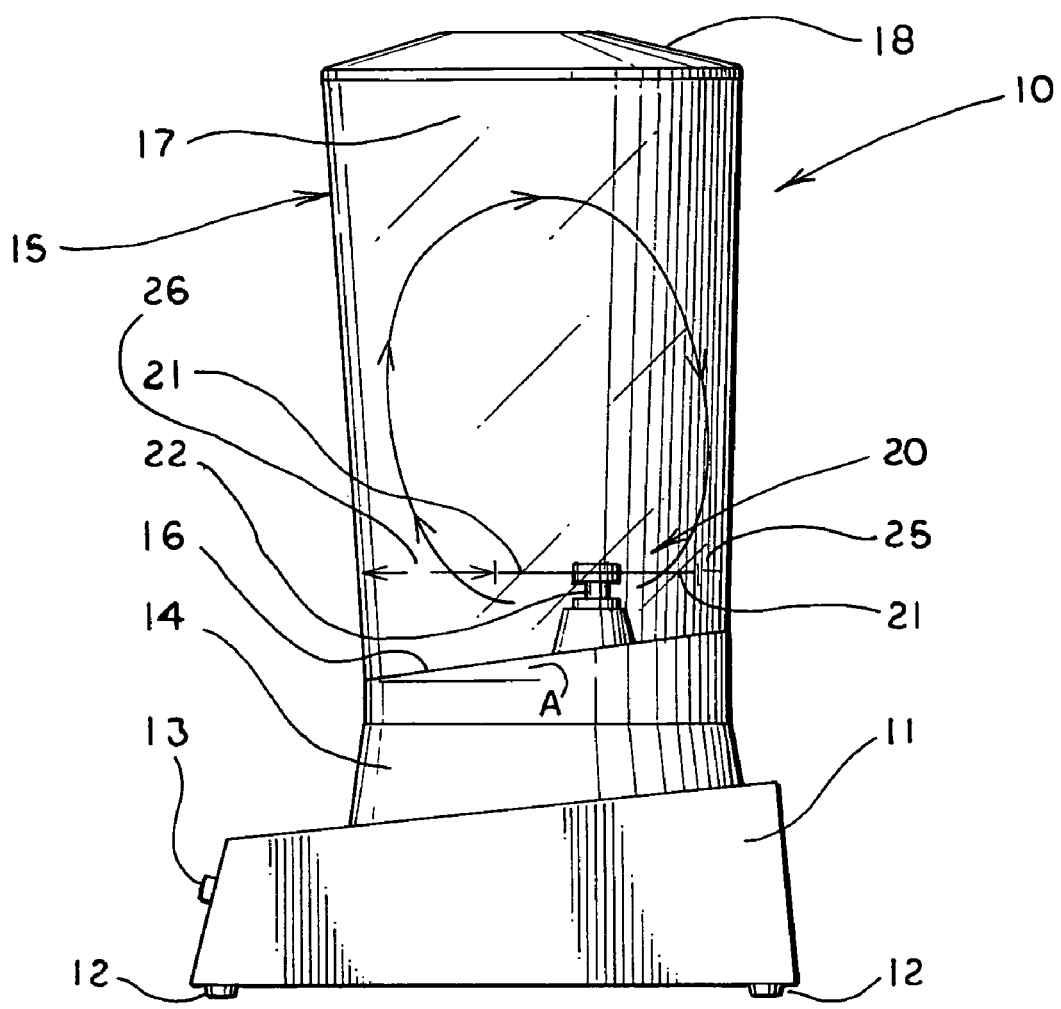
FIG. 1 is a somewhat schematic side elevational view of a blender having a container made in accordance with the concepts of the present invention.
Figure 2:
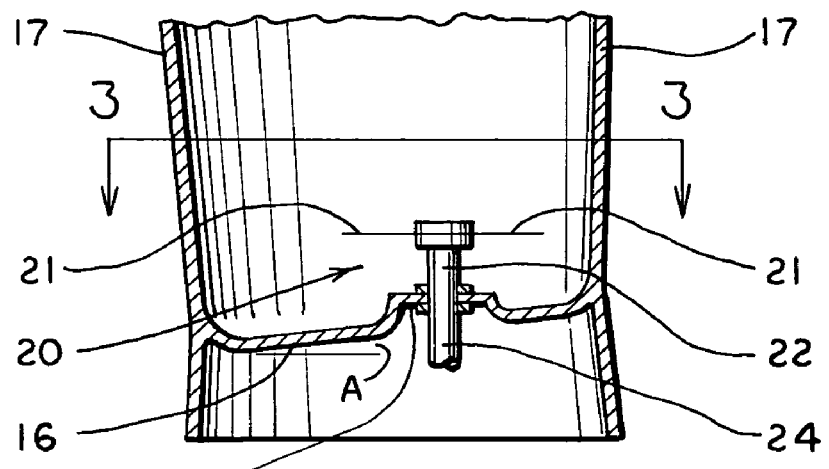
FIG. 2 is a somewhat schematic, fragmented vertical sectional view of the container shown in FIG. 1.

A blender is shown schematically in FIG. 1 and is indicated generally by the numeral 10. Blender 10 includes a base portion 11 which, via feet 12, may rest on any suitable operating surface. Base 11 houses a motor and other controls which may be operated at a control panel 13. A pedestal 14 is carried by base portion 11 and is adapted to receive the container made in accordance with the present invention and generally indicated by the numeral 15.

Container 15 includes a bottom surface 16 with a side wall 17 extending upwardly from the perimeter of the bottom surface 16. Side wall 17 is quite often transparent and generally defines an open top for container 15 which can be closed, as desired, by a cover or lid 18. Container 15 is most often provided with a handle (not shown) on the side wall, and usually a spout is formed at the top perimeter of the side wall so that liquid may readily be poured out of container 15.

A blade assembly, generally indicated by the numeral 20, is positioned within container 15 above bottom surface 16. Blade assembly 20 can be of a conventional blender blade configuration and, as such, includes a plurality of radially extending blades 21 which are carried by, and positioned above bottom surface 16 by, a vertically oriented shaft 22. Shaft 22 extends downwardly through a hub 23 formed in container bottom surface 16 and is typically connected, as by a spline, to a motor shaft 24. As is rather conventional for blenders, placement of container 15 on pedestal 14 automatically makes a connection between blade assembly 20 and the motor of the blender such that upon activation of the motor, the rotation of motor shaft 24 is transferred to blade shaft 22, and blades 21 are rotated above bottom surface 16 of container 15.

Figure 3:
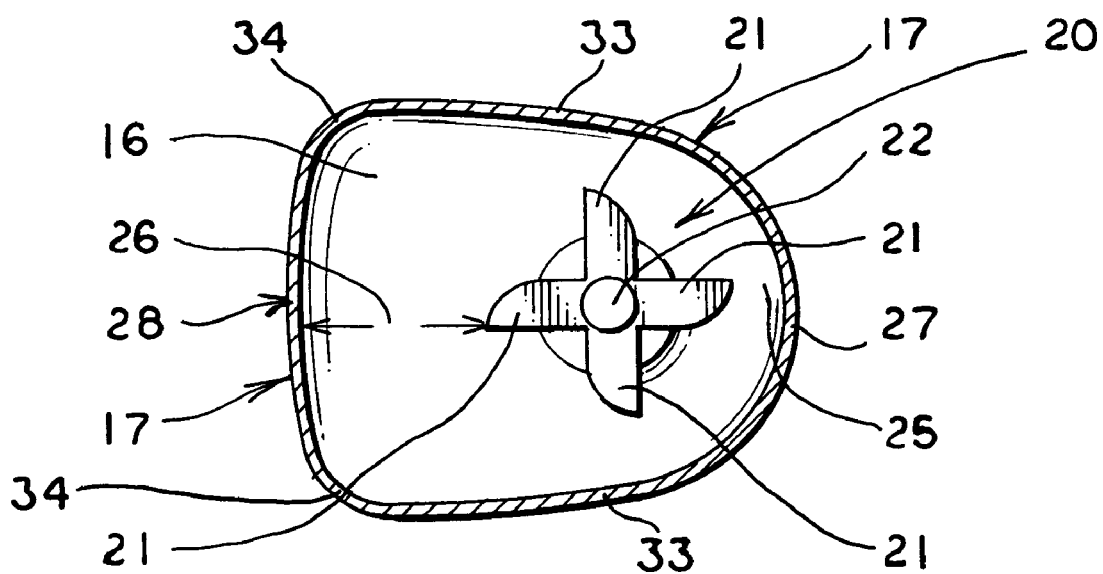
FIG. 3 is a sectional view taken substantially along line 3-3 of FIG. 2.
Figure 4:
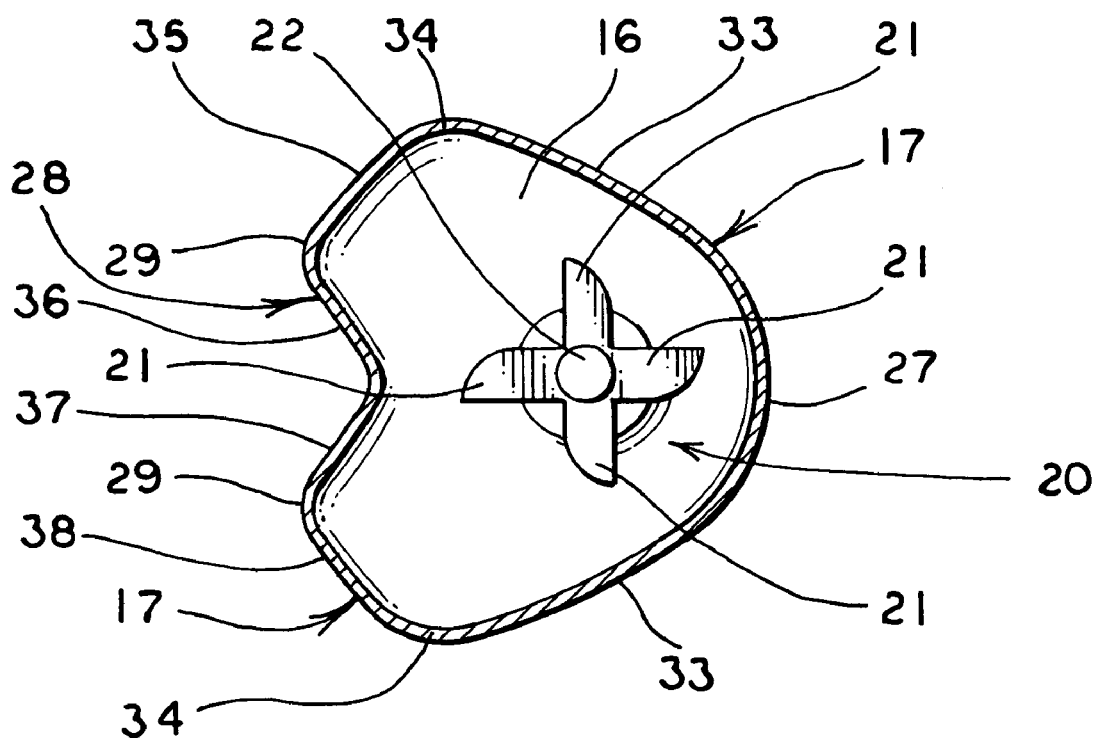
FIG. 4 is a sectional view similar to FIG. 3 but showing an alternative embodiment.
Figure 6:
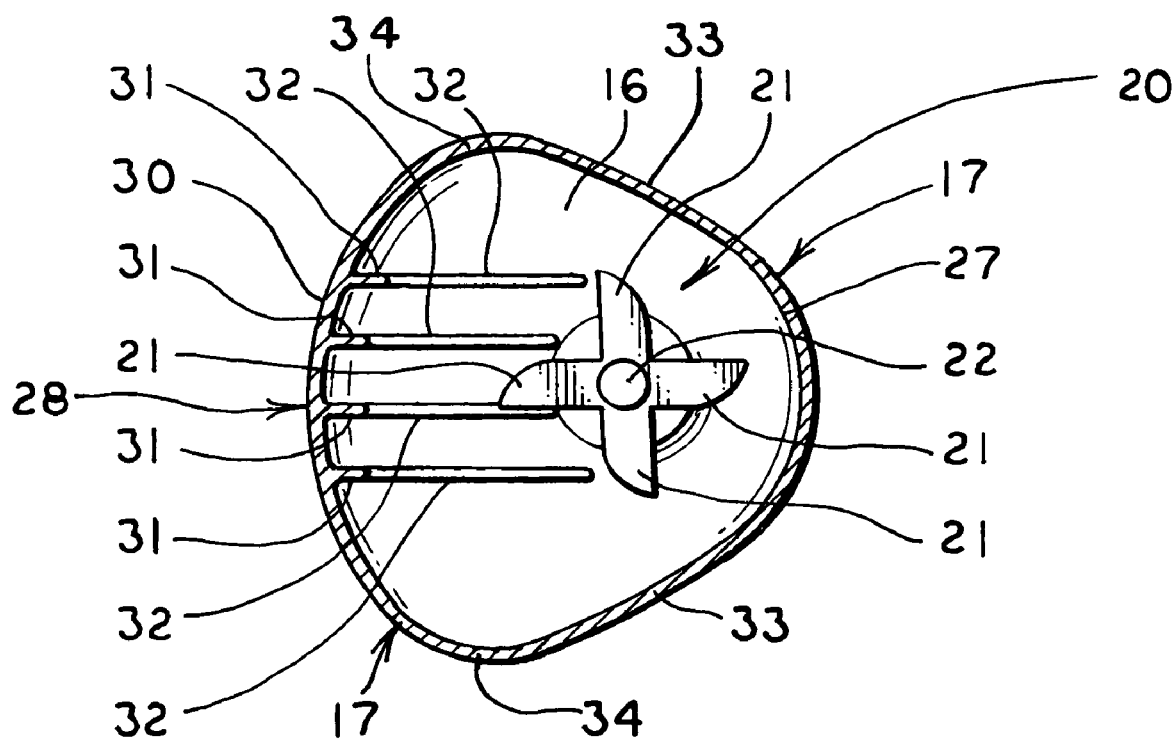
FIG. 6 is a sectional view taken substantially along line 6-6 of FIG. 5.

The container 15 of the present invention includes several features which enable it to more efficiently blend ingredients which were heretofore difficult to blend, such as frozen or viscous fluids. One of those features relates to the position of the blade assembly 20 in container 15. As shown in the drawings, blade assembly 20 is not centered relative to bottom surface 16. That is, irrespective of the shape of surface 16, be it circular, square, rectangular, or a non-symmetrical shape such as shown in FIGS. 3, 4 and 6, the axis of rotation of blades 21, as defined by shaft 22, is not positioned on the centroid of the bottom surface 16.

As a result, a fluid flow pattern, shown by the arrows in FIG. 1, is created. This flow pattern is to be contrasted with the flow pattern of the prior art wherein the fluid exits the blades at the small area between their tips and the side wall of the container and moves uniformly upwardly as a thin sheet along the walls of the container. The fluid in the prior art is thereafter turned near the top thereof and redirected down toward the center of the rotating blades. It is this uniform movement, however, which assists in creating the bridge which forms the air pocket around the blades.

The new nonuniform flow pattern shown in FIG. 1 avoids the problems of the prior art. That is, because the clearance between the tips of blades 21 and the nearer side wall 17, indicated as 25 in the drawings, is minuscule, as compared to the clearance 26 between the side wall 17 further away from blades 21, fluid flow upwardly at clearance 25 is essentially eliminated with the bulk of the upward movement of the fluid being directed through clearance 26 in one relatively large concentrated stream. This up-flow therefore occurs only over a portion of the circumference of blades 21, and uninterrupted down flow through the blades will occur around the remaining portion of the circumference. Such a nonuniform, non-symmetrical or unbalanced flow will disrupt the tendency of the fluid to form the undesirable bridge.

Another factor which contributes to the desired nonuniform flow created by the present invention is the fact that, in the preferred embodiment, the shape of bottom surface 16 is non-symmetrical or otherwise irregular. That is, while a desirable flow can be created with an off-centered blade assembly 20 and a regularly configured or symmetrical bottom surface 16, the desired flow can be enhanced by, and in fact, even independently created by, a bottom surface 16 which is irregular or non-symmetrical in configuration.

Examples of such non-symmetrical bottom surfaces 16 are shown in FIGS. 3, 4 and 6. That shown in FIG. 3 is currently most preferred. In general, the FIG. 3 configuration is somewhat like a flattened ellipse with the container side wall 17 having a curved side wall or surface 27 on the side nearest to the axis 22 of blade assembly 20 and a substantially flat surface 28 opposed to side wall 27 on the side further from the axis 22 of blade assembly 20. A generally flat wall or surface 33 is formed on each side of side wall 27, and walls 33 intersect surface 28 at intersections 34. The side wall 27 is closer to the axis 22 of rotation of blade assembly 20 than the intersections 34.

In the example shown in FIG. 4, the surface 28 is shown as including as many as four generally flat walls 35, 36, 37, and 38. Walls 35 and 38 intersect generally flat walls 33 at intersections 34, and the intersection of walls 35 and 36, and walls 37 and 38 form two lobes 29, rendering the overall configuration generally heart-shaped. As shown, each lobe 29 is generally equidistant from the center of surface 28. And in FIG. 6, the surface 28 has been rounded, as at 30, to provide an overall configuration of generally a teardrop shape.

It should be noted that a common feature of all of these configurations is the side wall 27 on the side of bottom surface 16 adjacent to blade assembly 20. Side wall 27 is shown as being curved having a radius of curvature that generally approximates the curvature of the circle that the tips of blades 21 transcribe when rotating. As such, the small clearance 25 is defined opposite to the direction of greatest displacement of blade assembly 20 from the centroid of the bottom surface 16, and the large clearance 26 is in the direction of the greatest displacement of blade assembly 20 from that centroid. This changing clearance further contributes to the preferred flow because at small clearance area 25, flow exiting the blades is unable to squeeze back through the small gap, but rather is swept around under the blade to escape at area 26 having the larger clearance.

An additional feature which contributes to the nonuniform flow is the fact that in the preferred embodiment, bottom surface 16 is inclined at an angle A relative to the plane normal to the axis of rotation of blade assembly 20. That is, bottom surface 16 is not horizontal and does not intersect shaft 22 of blade assembly 20 at a right angle. While bottom surface 16 is shown as a continuous member being oriented at angle A from horizontal, it should be evident that it need not be in a single plane but rather could be made up of a plurality of stepped regions creating the overall angled surface.

Thus, bottom surface 16 slopes downwardly at angle A from the location of blade assembly 20 toward the side of container 15 furthest away from blade assembly 20. That is, bottom surface 16 is the lowest at the area of the largest blade clearance 26. As such, the sloped bottom generates a force exiting blades 21 which is the sine of angle A, this force being parallel to the bottom surface 16 and in the direction away from the axis of rotation of blades 21 which thereby enhances the flow in that direction as previously described. Although the exact extent of angle A is not critical, it has currently been found that an angle A of about ten degrees will provide the desired results.

In addition to improving or enhancing the desired flow, as previously described, the sloped bottom surface 16 provides additional blending benefits. By virtue of the sloped bottom surface 16, the distance between each blade 21 and the bottom surface 16 will vary as the blades rotate. As a result, the blades 21 will experience a variation in load as they rotate, which variation repeats itself with each revolution. As such, there is a repeating circumferential hydraulic imbalance which improves the pumping action of the blades, which creates additional desirable turbulence in the container 15, and which further enhances the net movement in the direction of the arrow in FIG. 1, as previously described.

In summary as to the foregoing, at least three factors of the present invention enhance the flow in the blending of viscous fluids. These factors are the off-center blade assembly, the non-symmetrical bottom surface and the sloped bottom surface, which may singly, or in combination, enhance the flow pattern.

Figure 5:
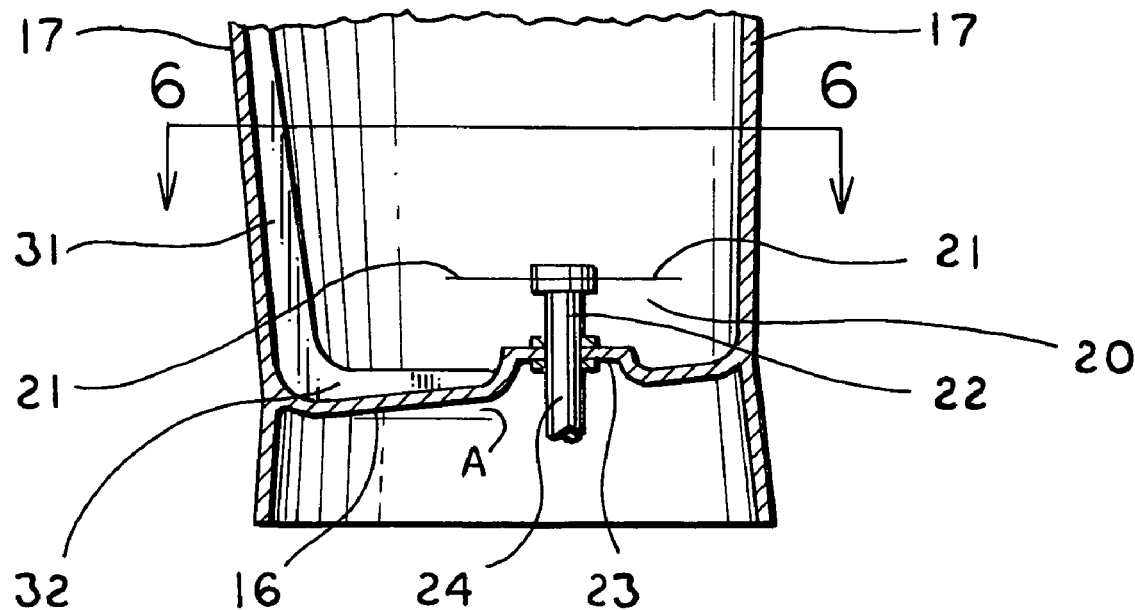
FIG. 5 is a somewhat schematic, fragmented vertical sectional view similar to FIG. 2 but showing an alternative embodiment.

In addition to these three features, even further blending optimization may be obtained by forming a plurality of adjacent vanes 31 on the portion of side wall 17 furthest away from blade assembly 20. Side wall vanes 31 preferably continue and extend along bottom surface 16 as bottom vanes 32, as shown in FIGS. 5 and 6. These vanes 31 and 32 will reduce the tendency of the created flow from swirling and will focus the discharge flow from blades 21 into a concentrated stream of upwardly moving fluid. This stream then provides the majority of the unbalanced force to discourage the formation of the bridge.

In light of the foregoing, it should thus be evident that a blender container constructed as described herein substantially improves the art and otherwise accomplishes the objects of the present invention.

What is claimed is:

1. A container for a blender comprising a blade assembly rotatable on an axis, a curved side wall, a side wall surface opposed to said curved side wall, and a substantially flat wall on each side of said curved side wall, each said flat wall intersecting said surface, said surface including two lobes, said lobes being equidistant from the center of said surface, said curved side wall being closer to said axis than the intersections of said flat walls and said surface.

2. A container for a blender comprising a blade assembly rotatable on an axis, a curved side wall, a side wall surface opposed to said curved side wall, and a substantially flat wall on each side of said curved side wall, each said flat wall intersecting said surface, said surface including at least one wall which is generally curved and at least one wall which is substantially flat, said curved side wall being closer to said axis than the intersections of said flat walls and said surface.

* * * * *